(12) United States Patent
Raddatz

(10) Patent No.: US 7,650,053 B2
(45) Date of Patent: Jan. 19, 2010

(54) CHROMATIC DISPERSION COMPENSATION USING WAVELENGTH TUNABLE TRANSMITTER

(75) Inventor: Lutz Raddatz, Plauen (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 322 days.

(21) Appl. No.: 11/342,471

(22) Filed: Jan. 30, 2006

(65) Prior Publication Data

US 2007/0177840 A1 Aug. 2, 2007

(51) Int. Cl.
*G02B 6/28* (2006.01)
(52) U.S. Cl. .......................................... 385/24; 385/37
(58) Field of Classification Search .................. 385/24, 385/37, 123, 132
See application file for complete search history.

(56) References Cited

U.S. PATENT DOCUMENTS

| | | | |
|---|---|---|---|
| 6,563,614 B1 * | 5/2003 | Stephens et al. | 398/5 |
| 2002/0176457 A1 * | 11/2002 | DeCusatis et al. | 372/26 |
| 2003/0215236 A1 * | 11/2003 | Manifold | 398/79 |
| 2005/0226613 A1 * | 10/2005 | Raddatz | 398/27 |
| 2006/0083144 A1 * | 4/2006 | Piede et al. | 369/100 |

* cited by examiner

*Primary Examiner*—Ellen Kim
(74) *Attorney, Agent, or Firm*—Wall & Tong, LLP

(57) ABSTRACT

A method and system for high bit rate fiber-optic communications utilize a wavelength tunable transmitter controlled by a feedback signal from an error analyzer associated with a received optical data stream without utilizing a dispersion compensation module in the transmitter and/or receiver portion.

20 Claims, 3 Drawing Sheets

CHROMATIC DISPERSION COMPENSATION USING WAVELENGTH TUNABLE TRANSMITTER

FIELD OF THE INVENTION

The invention is related to the field of optical communications, and in particular, to chromatic dispersion compensation using wavelength tunable transmitter.

BACKGROUND OF THE INVENTION

In high bit rate fiber-optic communication systems, chromatic dispersion in transmission fibers is a critical distance-related factor. Chromatic dispersion is a property of an optical fiber that causes different wavelengths propagate along the fiber at different speeds. Chromatic dispersion causes the signal to become more distorted as the signal propagates along the fiber. Chromatic dispersion of a fiber varies as the fiber ages or because of environmental factors, such as changes of temperature, atmospheric pressure, and the like. Without special compensation techniques, chromatic dispersion imposes a limit on a transmission distance and a modulation bit rate of a fiber-optic communication system.

In a conventional fiber-optic communication system, data is transmitted through a transmission fiber at a fixed optical wavelength and the transmission fiber is associated with one or more dispersion compensation modules (DCMs) disposed at the transmitter and/or receiver terminals of the system. The wavelength dependency of the DCMs is selected to either cancel or reduce to an acceptable level the chromatic dispersion of the transmission fiber over the wavelength band of interest.

However, such means of compensating chromatic dispersion add to already high complexity and high cost of the fiber-optic communication systems.

SUMMARY

Various deficiencies of the prior art are addressed by the present invention of a receiver scheme adapted to reduce the impact of chromatic dispersion.

In accordance with one embodiment of the invention, chromatic dispersion is reduced or eliminated by adjusting a transmitter wavelength to cause alignment with the zero dispersion wavelength of a transmission fiber. Advantageously, there is no need to utilize a conventional dispersion compensation module (DCM) at the transmitter and/or receiver. Thus, the terminals are less complex and less costly to produce.

The invention further provides other methods and system elements that implement various aspects, embodiments, and features of the invention, as described in further detail below. The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

Figure 1:
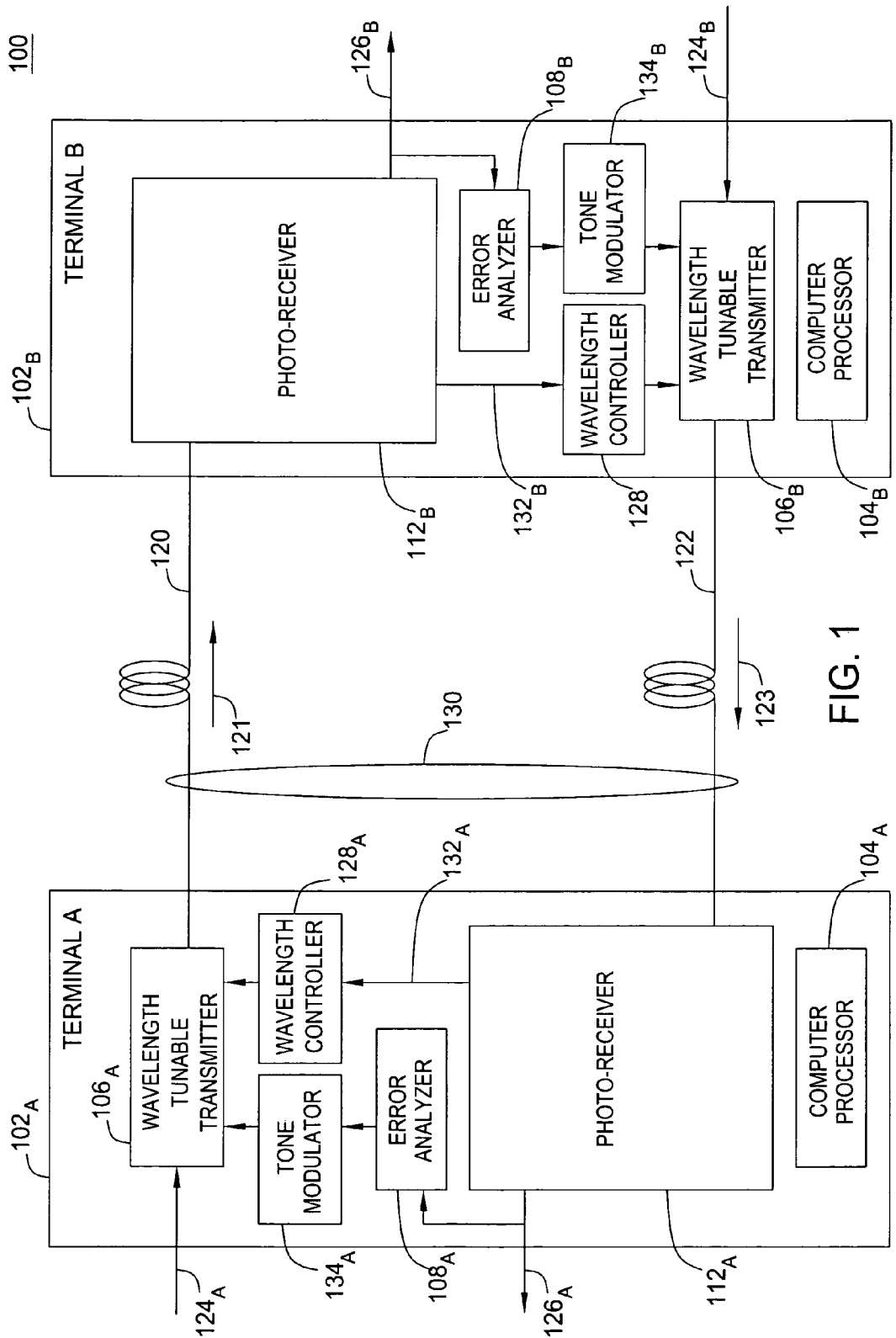
FIG. 1 depicts a high-level schematic diagram of a fiber-optic communication system suitable for use with the present invention.

However, the appended drawings illustrate only exemplary embodiments of this invention and are therefore not to be considered limiting of its scope, for the invention admits to other equally effective embodiments.

DETAILED DESCRIPTION OF THE INVENTION

The present invention is generally described within the context of fiber-optic communication systems. It will be appreciated by those skilled in the art that the invention may be utilized within the context of metro core and regional fiber-optic communication systems and networks, as well as any high bit rate fiber-optic communication systems and networks and/or portions thereof. Other optical systems will benefit from the invention.

Hereafter, similar apparatuses and devices are identified using the same numeric references, except that the suffixes "A" and "B" may be added, when appropriate, to differentiate between specific apparatuses and devices. These apparatuses and devices may also be referred to generally by their reference numeral without any appended suffix.

FIG. 1 depicts a high-level schematic diagram of a fiber-optic communication system suitable for use with the present invention. Specifically, the system 100 of FIG. 1 comprises transmitting/receiving terminals 102A and 102B coupled to one another using at least one fiber-optic pair 130 (one fiber-optic pair 130 is shown) of single-mode transmission fibers 120 and 122. In the depicted embodiment, the fiber 120 propagates optical data streams from the terminal 102A to the terminal 102B, and the fiber 122 propagates such data streams from the terminal 102B to the terminal 102A, as illustrated with arrows 121 and 123, respectively.

In one embodiment, each of the terminals 102 comprises a wavelength tunable transmitter 106, a photo receiver 112, an error analyzer 108, a tone modulator 134, and a wavelength controller 128, and a computer processor 104 administering operation of the terminal of the system 100. Alternatively (not shown), the error analyzer 108 is intermittently shared in the respective terminal by fibers of two or more fiber pairs.

The wavelength tunable transmitter 106 includes an electronically controlled solid-state laser (e.g., external cavity laser (ECL)) and a high bit rate modulator, such as an exemplary Mach-Zehnder modulator (both not shown). An input of the transmitter 106 is coupled, using an electrical interface 124, to a source (not shown) of information (i.e., data steam) to be transmitted, such as a terminal of a wired communication network. In operation, the transmitter 106 converts the data streams communicated via the interface 124 from an electrical domain in the optical domain at a bit rate in a range from about 2.5 GB/s to 40 Gb/s or greater.

The high bit rate modulator of the transmitter 106 is one of on/off keying modulation formats (e.g., non-return-to-zero (NRZ) format, return-to-zero (RZ) format, carrier suppressed RZ (CSRZ) format, and the like) or phase-shift keying formats (e.g., differential phase shift keying (DPSK) format) to modulate intensity and/or phase of an output signal of the laser of the transmitter.

A modulated output signal of the transmitter 106A is coupled to an input of a corresponding transmission fiber (e.g., fiber 120) of the fiber pair 130 and propagates through that fiber to the photo receiver 112B of the terminal 102B. Accordingly, an input and an output of the transmission fiber 122 are coupled to an output of the transmitter 106B (terminal 102B) and an input of the photo receiver 112A (terminal 102A), respectively.

In one embodiment, the photo receiver 112 converts a received data stream from an optical format in the electrical format compatible with an electrical interface 126 to a recipient (not shown) of the transmitted data stream. Additionally, the photo-receiver 112 detects feedback signals that, in the system 100, control quality (i.e., error content) of fiber-optic communication links.

Specifically, quality of the received data stream is monitored using the error analyzer 108, which may be realized using one or more of a synchronous digital hierarchy (SDH) byte analyzer, a forward error correction (FEC) analyzer and the like. The error analyzer 108 produces an output information associated with transmission errors detected in the received data stream. Such errors are generally caused by insufficient compensation of chromatic dispersion in the respective transmission fiber. Detected error content includes bit errors, synchronization errors, and the like.

Error-related information collected from the error analyzers 108A and 108B is converted to an electrical control signal or other formats. In one embodiment, the electrical control signal is used to achieve best compensation of chromatic dispersion in the fiber transmitting the data stream. In the system 100, such compensation of chromatic dispersion is achieved by adjusting a wavelength of the wavelength tunable transmitter 106 that originated the data stream being analyzed by the respective error analyzer.

In operation, the error analyzers 108A and 108B facilitate formation of control loops providing compensation of chromatic dispersion in the transmission fibers 120 and 122. An error-related feedback signal produced, for example, by the error analyzer 108B, is communicated to the terminal 102A by the transmission fiber 122 (i.e., return fiber, with respect to the fiber 120 transmitted the analyzed data stream) using a method of low frequency/low modulation depth tone modulation of the transmitter 106B. Correspondingly, such feedback signal produced by the error analyzer 108A is communicated to the terminal 102B by the transmission fiber 120 by similarly modulating the transmitter 106A.

In an alternate embodiment (not shown), the error signal is transmitted to the respective wavelength controller 128A or 128B using at least one of wired, wireless, and fiber-optic means of a management network operating the system 100, e.g., a private data communication network of a service provider.

In the depicted embodiment, modulation of the transmitter 106 with the error-related feedback signal is illustratively facilitated using the tone modulator 134 controlled by the error analyzer 108. In an alternate embodiment, the tone modulator 134 is a portion of the transmitter 106.

Information carried by the feedback signal is detected in the photo-receiver 112 and, via a control interface 132, provided to the wavelength controller 128 of the transmitter 106, which originated that error-affected data stream. In one embodiment, the wavelength controller 128 selectively steps the wavelength of the transmitter 106 through the wavelength tuning range of the transmitter being adjusted until a number of errors in the data steam received at the other terminal is minimal.

In an alternate embodiment, the wavelength controller 128 performs a wavelength dither algorithm to minimize an error content of the data steam being transmitted. In yet another embodiment, the wavelength controller 128 is a portion of the computer processor 104.

In one embodiment, a bandwidth of the wavelength control channel and a depth of the tone modulation are about 5-200 mkHz and 0.5-3%, respectively. Such modulation of the transmitters 106 has very little effect on performance of high bit rate fiber-optic communication links between the terminals 102, as well as is insensitive to an amount of uncompensated chromatic dispersion in the fiber that are used for transmitting the feedback signals.

Figure 2:
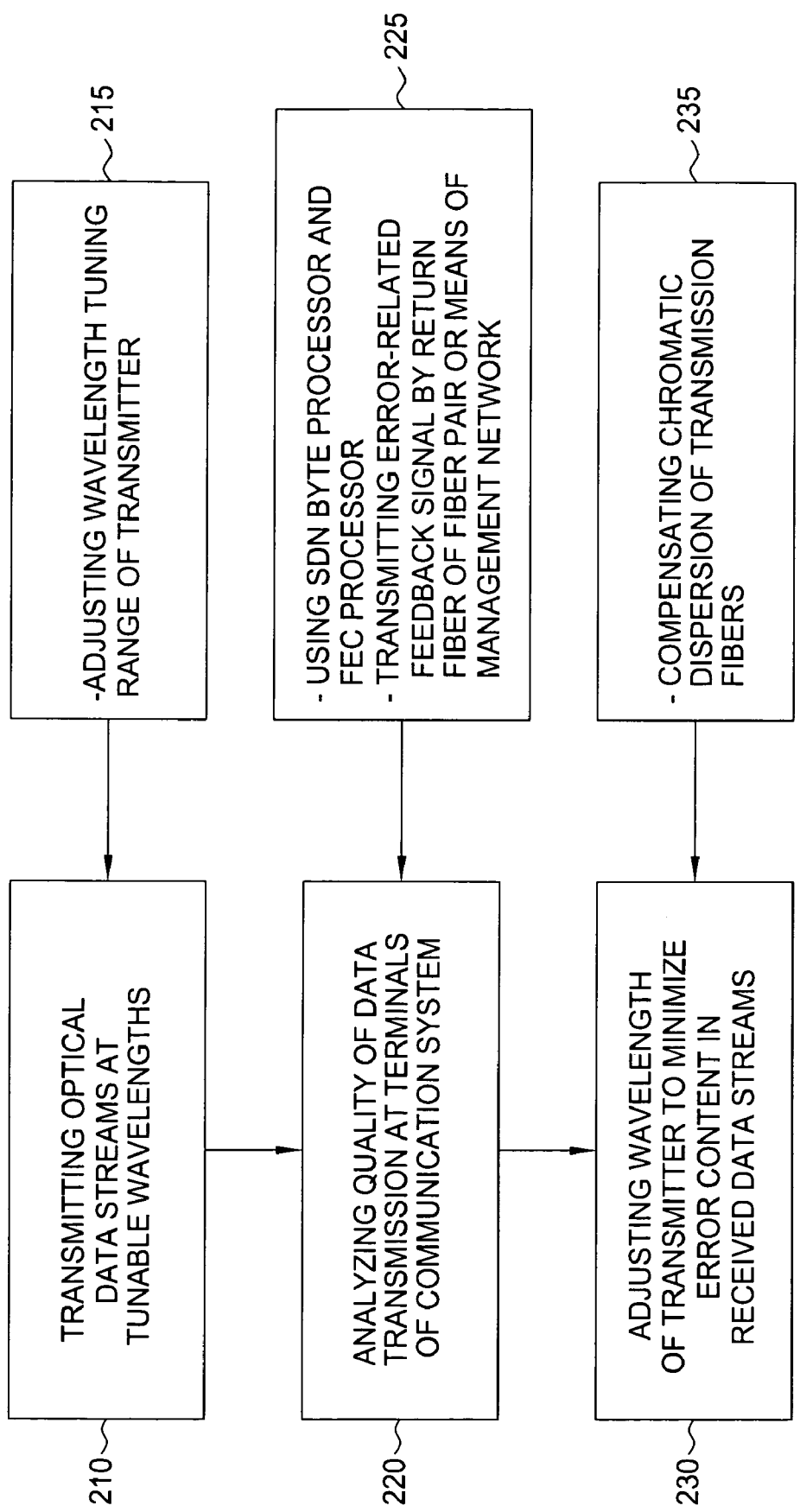
FIG. 2 depicts a flow diagram of a method for providing high bit rate fiber-optic communications using the system of FIG. 1 according to one of the present invention.

FIG. 2 depicts a flow diagram of a method for providing high bit rate fiber-optic communications using the system of FIG. 1. Specifically, the method of FIG. 2 contemplates several system functions suitable for use in accordance with embodiments of the present invention.

The method of FIG. 2 starts at step 210 where high bit rate fiber-optic communication links are established between the terminals 102A and 102B of the system 100 using the transmission fibers 120 and 122. Optical data streams are originated using the wavelength tunable transmitters 106A and 106B.

Referring to a box 215, a wavelength tuning range of the transmitters 106A and 106B is adjusted by tuning the transmitter to a zero dispersion wavelength of the transmission fiber 120 and 122. The zero dispersion wavelength depends on the type of fiber and can be any value between approximately 1250 nm to 1600 nm.

At step 220, the quality of transmitted data streams (e.g., number of transmission errors) is analyzed at the terminals 102A and 102B using the error analyzers 102A and 102B, respectively. A feedback signal corresponding to an amount of detected errors is outputted to a tone modulator providing low frequency/low modulation depth tone modulation of the transmitter of the terminal where the received data stream has been analyzed.

Referring to a box 225, a SDH byte analyzer, a forward error correction (FEC) analyzer, and the like means are used to determine a quality level of the received data stream. A feedback signal from the receiving terminal to the terminal transmitted the analyzed data stream is delivered using a transmission fiber that simultaneously carry high bit rate data traffic. Alternatively, the feedback signal is communicated using a wired, wireless, and/or fiber-optic means of a management network of a service provider (not shown) operating the system 100.

At step 230, the transmitted feedback signal is detected at the terminal, which transmitted the error-containing data stream and is used to adjust the wavelength of the transmitter 106 originated that date stream. The wavelength is adjusted, within a tuning range of the transmitter, until a minimal bit error rate is achieved in the data streams delivered from that transmitter.

Figure 3:
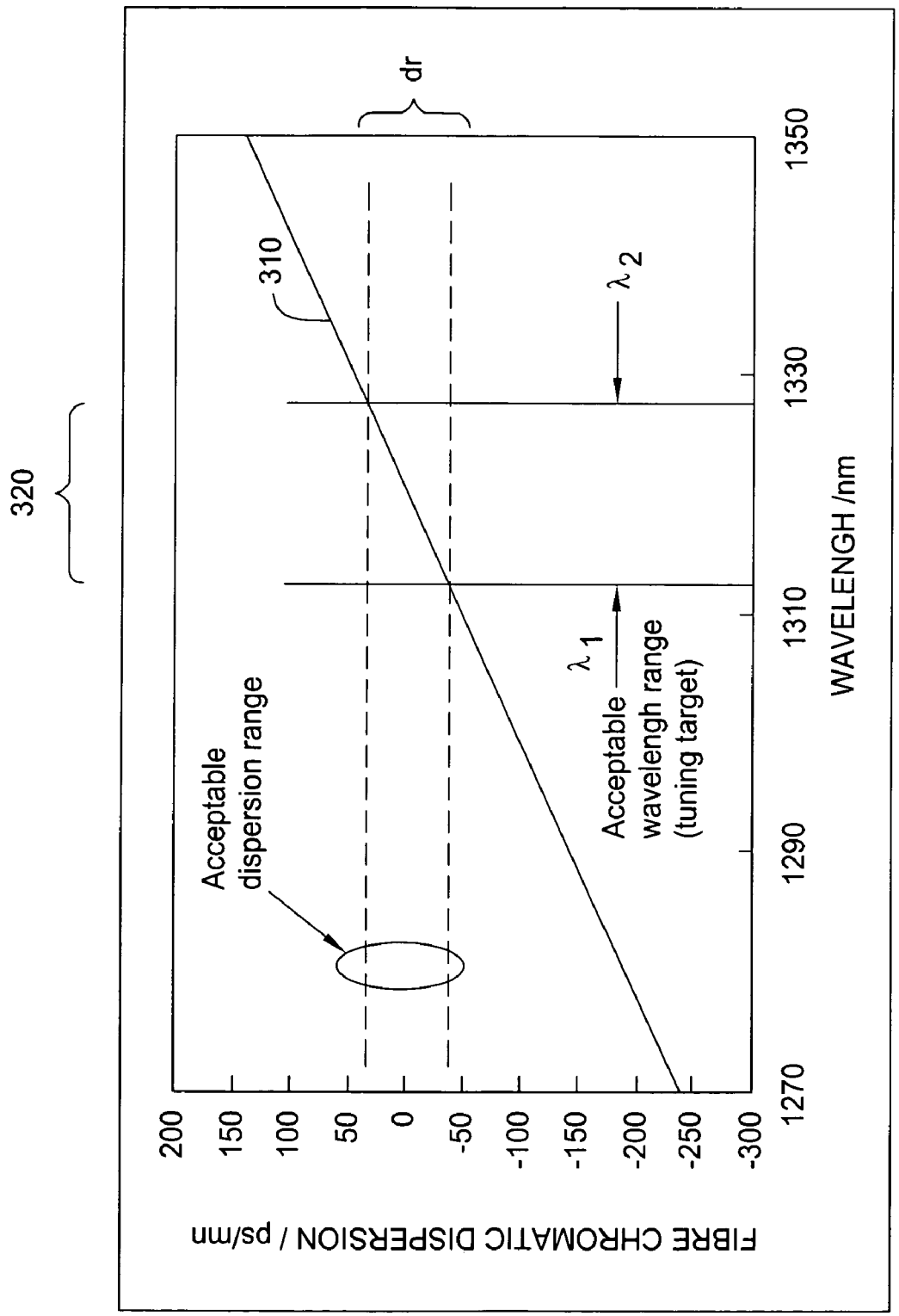
FIG. 3 depicts a graphical representation of dispersion compensation according to an embodiment of the invention.

Referring to a box 235, adjustment of the wavelength of the transmitter 106 facilitates compensation of chromatic dispersion in the transmission fibers of the system 100. FIG. 3 depicts a graphical representation of dispersion compensation according to an embodiment of the invention. Specifically, FIG. 3 depicts span dispersion as a function of wavelength to show that the dispersion of span fiber 310. A portion of the span dispersion bounded by a first wavelength ($\lambda_1$) and a second wavelength ($\lambda_2$) is within an acceptable range of span dispersion dr.

This dispersion range dr, via the wavelength dependence of the fiber 310, defines the wavelength range to which a transmission system utilizing the present invention must be tuned to operate successfully. This dispersion range dr is related to the system's bit rate and modulation format.

In one embodiment of the invention, the amount of chromatic dispersion acceptable by the system is between ±50 ps/mn. Dispersion compensation of the transmission system is achieved by tuning the transmitter to between approximately 1290 and 1330 nm wavelengths for standard single mode fiber, using the control algorithm described above. If the tunable transmitter covers this wavelength range, then the chromatic dispersion of the fiber can be minimized as described above. In another embodiment, dispersion compensation of the transmission system is achieved by tuning the transmitter to between wavelengths of approximately 1535 nm to 1565 nm for dispersion-shifted fiber. In a further embodiment, dispersion compensation of the transmission system is achieved by tuning the transmitter to between wavelengths of approximately 1250 nm to 1600 nm such that the same transmitter is capable of being used with many other types of fibers that have zero dispersion around other wavelengths such as 1450 nm and 1580 nm. Depending on the type of fiber, other tunable ranges for the transmitter are possible.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. Method for receiving high bit rate communications from an optical span having at least one pair of fibers, comprising:
   receiving data at tunable optical wavelengths via a first fiber of a pair of fibers, the optical wavelengths not being subject to compensation during said receiving;
   analyzing error data associated with the received data; and
   propagating a control signal toward a wavelength tunable transmitter of the optical wavelengths via at least one of a second fiber of said pair of fibers and a management network, said control signal adapted to modify an optical wavelength transmission parameter in a manner tending to reduce said error data.

2. The method of claim 1, wherein the analyzing step uses error data produced by one or more of a byte analyzer or a forward error correction analyzer.

3. The method of claim 1, wherein the tunable optical wavelengths are disposed in a range of approximately 1290 to 1330 nm.

4. The method of claim 1, wherein the tunable optical wavelengths are disposed in a range of approximately 1250 to 1600 nm.

5. The method of claim 1, wherein receiving the data at an optical wavelength tending to reduce error data in the span includes incrementally changing a tuning range of the wavelength tunable transmitter.

6. The method of claim 1, wherein a feedback signal is transmitted using low frequency/low modulation depth tone modulation of the transmitter in a terminal receiving the transmitted optical data streams.

7. The method of claim 1, wherein the error data includes at least one of a number of synchronization errors and a number of bit errors.

8. The method of claim 1, wherein the received data forming an optical data steams at a bit rate in a range from approximately 2.5 GB/s to 40 Gb/s using an on/off keying modulation format or a phase shift keying format.

9. The method of claim 1, wherein the received data forming an optical data steams at a bit rate above 40 Gb/s using an on/off keying modulation format or phase shift keying format.

10. The method of claim 1, wherein said management network transmits a feedback signal and comprises at least one of a wired, wireless and fiber-optic means of data communications.

11. A system for high bit rate optical communications having a first terminal and a second terminal, each terminal having a transmission portion and a receiving portion, comprising:
    a span having at least one pair of fibers;
    the first terminal coupled to a first end of the span; and
    the second terminal coupled to a second end of the span;
    wherein each terminal comprises:
    a wavelength tunable transmitter located at the transmission portion;
    a photo-receiver located at the receiving portion, wherein the receiving portion does not include a dispersion compensation module to compensate for chromatic dispersion of a received data stream from the span; and
    an error analyzer associated with the received data stream, wherein the error analyzer provides a feedback signal controlling a wavelength of the wavelength tunable transmitter of the received optical data stream whereby the wavelength of the wavelength tunable transmitter is incrementally adjusted to reduce transmission errors in received optical data streams.

12. The system of claim 11, wherein a tuning range of the wavelength tunable transmitter is approximately 1290 to 1330 nm.

13. The system of claim 11, wherein a tuning range of the wavelength tunable transmitter is approximately 1250 to 1600 nm.

14. The system of claim 11, wherein the wavelength tunable transmitter is an electronically controlled solid-state laser.

15. The system of claim 11, wherein the bit rate of the optical data streams is in a range from approximately 2.5 GB/s to 40 Gb/s.

16. The system of claim 11, wherein the error analyzer comprises a byte analyzer and/or a forward error correction analyzer.

17. The system of claim 11, wherein the feedback signal is transmitted using a fiber complimentary to the fiber of a pair of fibers transmitting the received optical data stream.

18. The system of claim 11, wherein the feedback signal is transmitted using at least one of a wired, wireless and fiber-optic management network.

19. The system of claim 11, wherein the feedback signal is a low frequency/low modulation depth tone modulation of the wavelength tunable transmitter of the terminal receiving the optical data stream.

20. The system of claim 11, wherein the wavelength is incrementally changed in a tuning range of the wavelength tunable transmitter in a manner tending to reduce errors in the received optical data streams.

* * * * *

UNITED STATES PATENT AND TRADEMARK OFFICE
CERTIFICATE OF CORRECTION

| | | |
|---|---|---|
| PATENT NO. | : 7,650,053 B2 | Page 1 of 1 |
| APPLICATION NO. | : 11/342471 | |
| DATED | : January 19, 2010 | |
| INVENTOR(S) | : Lutz Raddatz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 66 days.

Signed and Sealed this

Twenty-eighth Day of December, 2010

David J. Kappos
*Director of the United States Patent and Trademark Office*